US005252813A

United States Patent [19]

Hamada et al.

[11] Patent Number: 5,252,813

[45] Date of Patent: Oct. 12, 1993

[54] METHOD AND APPARATUS FOR AUTOMATIC TRANSACTION HAVING CARD RECEIPT AND/OR TRANSACTION RECEIPT SLIP ISSUING MECHANISM

[75] Inventors: Yasunori Hamada, Tsuchiura; Masuo Furutono, Ibaraki, both of Japan

[73] Assignee: Hitachi, Ltd., Tokyo, Japan

[21] Appl. No.: 682,540

[22] Filed: Apr. 9, 1991

[30] Foreign Application Priority Data

Apr. 9, 1990 [JP] Japan ................................ 2-092217

[51] Int. Cl.[5] .............................................. G06F 15/30

[52] U.S. Cl. .................................... 235/380; 235/379; 235/437; 902/36; 902/18; 902/38; 902/5

[58] Field of Search ..................... 902/4, 18, 5, 10, 18, 902/36, 38, 20; 235/380, 379, 480, 437, 438, 381

[56] References Cited

U.S. PATENT DOCUMENTS 4,166,945 7/1979 Inoyama ................................ 902/4
4,314,352 2/1982 Fought .................................... 902/4
4,733,060 3/1988 Dono et al. ............................. 902/4
4,970,655 11/1990 Winn et al. ........................... 902/18

*Primary Examiner*—John Shepperd
*Assistant Examiner*—Esther Chin
*Attorney, Agent, or Firm*—Antonelli, Terry, Stout & Kraus

[57] ABSTRACT

An automatic transaction apparatus for dealing with cash or the like operates by being accessed by the user through the use of a user specific transaction medium card, which is inserted to the apparatus so that information recorded on it is read. In the event of some trouble of the apparatus, if the card cannot be ejected and returned to the user, a receipt slip of the card with information specific to the user being printed thereon is issued to the user in response to the ejection failure signal.

9 Claims, 4 Drawing Sheets

METHOD AND APPARATUS FOR AUTOMATIC TRANSACTION HAVING CARD RECEIPT AND/OR TRANSACTION RECEIPT SLIP ISSUING MECHANISM

BACKGROUND OF THE INVENTION

This invention relates to a method and apparatus for automatic transaction based on the use of a transaction medium card.

Japanese Patent Examined Publication No. 61-25187 of a conventional apparatus describes the transaction process after the user has inserted a card into the transaction machine on the assumption that the card will be processed normally.

This conventional machine involves such a problem that if the user's transaction medium card cannot be returned to the user due to some trouble in the automatic transaction machine, the user is unfavorably obliged to wait until he (or she) calls the staff responsible for maintenance of the machine and the staff is able to take the card out of the machine. If such a trouble occurs in an automated store without the attendance of staff or in a store where the machine is operated automatically without staff on holidays, the user is obliged to wait for a longer time until a member of the staff comes to solve the matter, and this is a serious problem.

In another example of a system described in Japanese Patent Unexamined Publication No. 62-221773, if a card jam occurs in a transaction machine of a local office of a firm, a message on the incident of the card jam is transmitted over a communication line to the main office where a staff is normally ready to respond and it is displayed on a display board of that office. In response to the message, member of the staff of the main office sends back a signal to the machine of the local office so as to take an appropriate action based on the content of the message, e.g., the issuance of a receipt slip. However, this conventional system, in which machines of local offices need to send the message to the main office at each incident of a card jam and proceed to the instructed subsequent action, is still deficient in the cases of transaction machines operated on holidays without a staff and transaction machines installed at the outside of offices.

SUMMARY OF THE INVENTION

An object of this invention is to provide a method and apparatus for automatic transaction, in which, if a transaction medium card of a user cannot be returned to the user due to some trouble in the machine, the machine operates automatically to issue a receipt slip of the card in response to the ejection failure signal.

The inventive apparatus incorporates a means of detecting that the transaction medium card cannot be returned to the user and a means of issuing a receipt slip on which information specific to the user is printed, thereby issuing a receipt slip for the card to the user promptly. The user specific information is selected from items of information recorded on the transaction medium card when the card has been read successfully, or from items of information entered by the user through the input means of the machine when reading of the card has failed.

In operation, a user who intends to make a transaction with the automatic transaction machine puts a transaction medium card into the specified port of the machine, and the card is introduced to the machine for the transaction process. During the card ejecting operation after the process, if the detection means detects that the card is not returned to the user, the machine operates on the receipt slip issuing means to issue a receipt slip, with user specific information being printed thereon, and the user does not need to wait for the return of the card.

DESCRIPTION OF THE PREFERRED EMBODIMENT

An embodiment of the present invention will be described with reference to FIG. 1 and FIG. 2.

Figure 2:
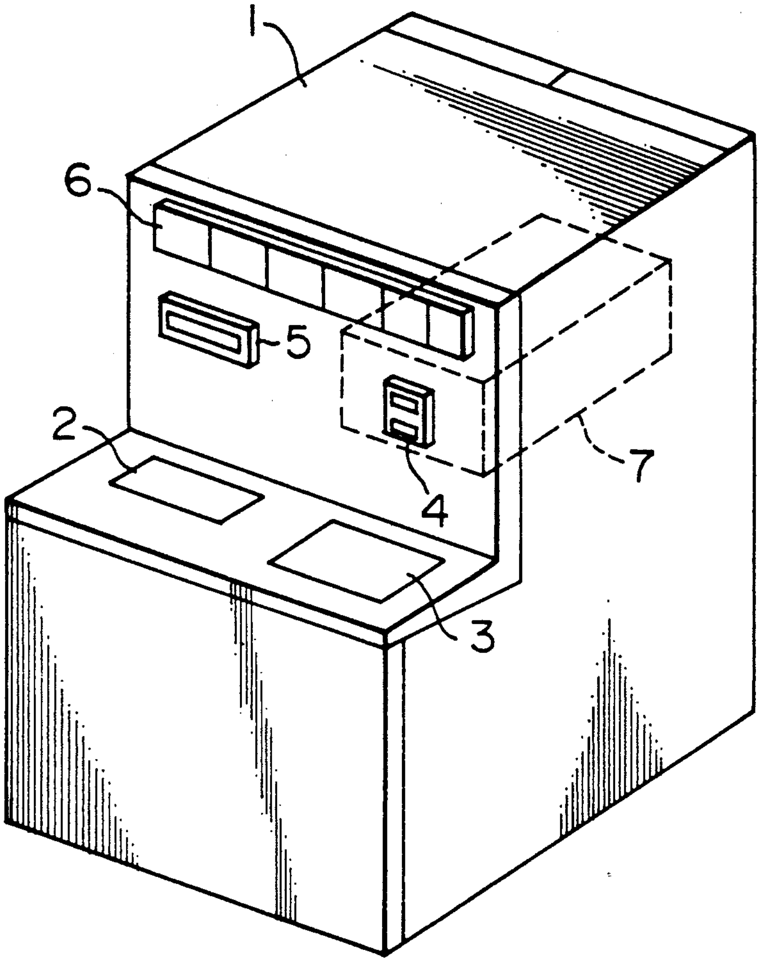
FIG. 2 is an external view of the automatic cash transaction machine based on an embodiment of this invention.

FIG. 2 is an external view of an automatic cash transaction machine which is an example of the automatic transaction apparatus. The machine 1 comprises a bank note port 2 through which the user puts bank notes into the machine or the machine releases bank notes to the user, an operation board 3 including a display panel for providing visual information to the user and an information input means for permitting the user to enter information to the machine, a card/slip port 4 through which the user's transaction medium card is put into and received from the machine and a transaction slip, such as transaction statement and a receipt slip for the card, is discharged from the machine, a bankbook port 5 through which a user's bankbook is put into and received from the machine, and a guide board 6 for displaying messages to the user.

Figure 1:
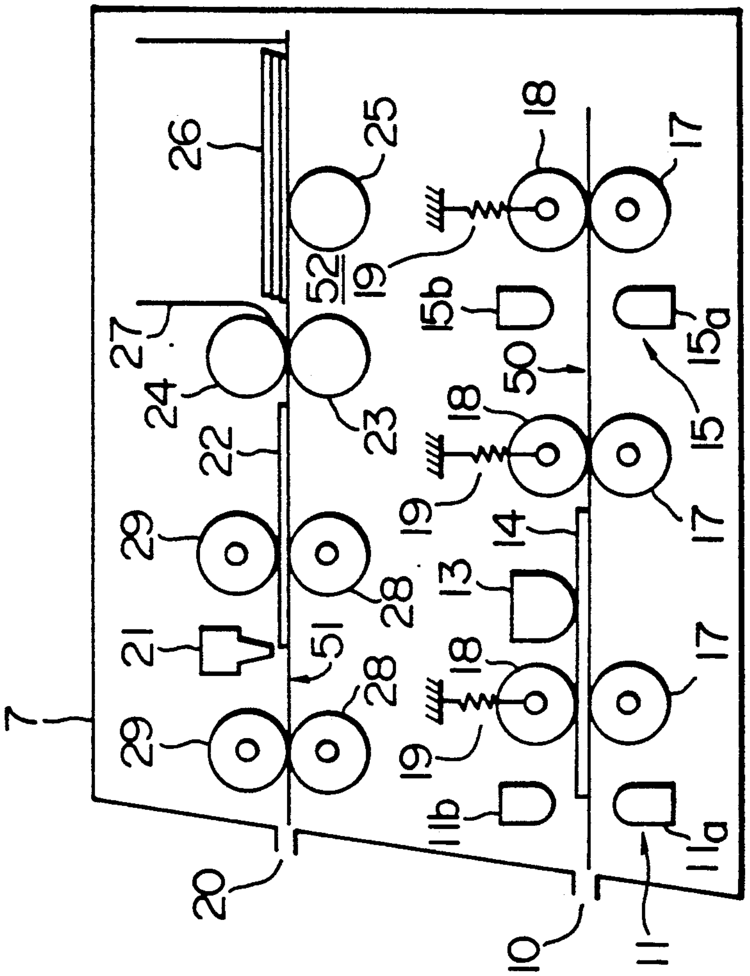
FIG. 1 is a cross-sectional diagram showing in detail the card/slip handling machine based on an embodiment of this invention.

FIG. 1 is a cross-sectional diagram showing in detail a card/slip hadling unit 7 incorporated in the machine shown in FIG. 2.

The card/slip port 4 is separated into a card port 10 for putting in and receiving a transaction medium card 14 and a slip delivery port 20 for discharging sheets 22. Provided near the card port 10 is a first sensor 11 for detecting the state of transportation of the card 14, and it is an optical sensor made up of a light emitting part 11*a* and a light sensitive part 11*b* for example.

The card 14 inserted into the card port 10 is fed on a first conveyance path 50, on which is disposed a train of multiple sets (three sets in this embodiment) of a feed roller 17 and another feed roller 18, which is pressed to the roller 17 by a spring 18, in a short interval alignment in the card feed direction. The feed rollers 17 and 18 are driven by a drive motor (not shown in FIG. 1) which is activated in accordance with the card detect signal produced by the first sensor 11.

At a position on the first conveyance path 50, there is disposed a magnetic head 13 which reads information in the form of magnetically stored record out of the card 14 or writes information into the card 14.

Further disposed on the first conveyance path 50 is a second sensor 15 for detecting the state of transportation of the card 14 after it has passed the magnetic head 13, and it is an optical sensor made up of a light emitting part 15b and a light sensitive part 15b for example.

The slip delivery port 20 is continuous to a second conveyance path 51, on which is disposed a train of multiple sets of a feed roller 28 and a counter feed roller 29. A sheet hopper 27 which accommodates sheets 26 is disposed at another end of the second conveyance path 51. A sheet dispensing roller 25 brings sheets 26 in the sheet hopper 27 between a pair of separation feed rollers 23 and 24.

At a position on the second conveyance path 51, there is disposed a print head 21 which prints on the slip 22 during the conveyance on the second conveyance path 51 by the feed rollers 28 and 29. The slip 22 is usually a printed record of a transaction to be delivered to the user, and it also serves as a receipt slip for a retained card in this embodiment of invention, as will be described later.

Figure 3:
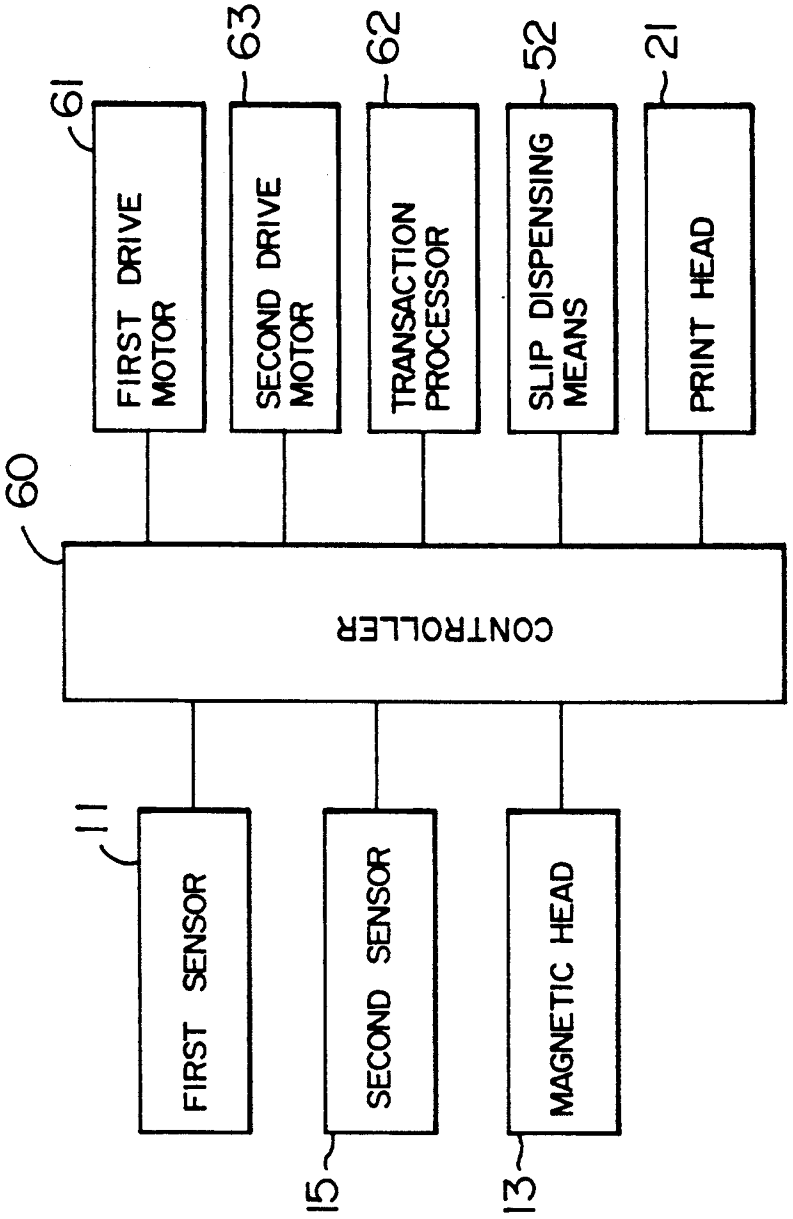
FIG. 3 is a block diagram showing, as an example, the systematic arrangement of the inventive apparatus.

FIG. 3 shows the systematic arrangement of the apparatus based on an embodiment of this invention. The detect signals produced by the first sensor 11 and second sensor 15 in FIG. 1 are sent to a controller 60. The information read out of the card 14 magnetically by the magnetic head 13 is also sent to the controller 60, and information is written into the card 14 in accordance with the signal from the controller 60.

The controller 60 operates on the first drive motor 61 to drive the feed rollers 17 and 18 on the first conveyance path 50 in accordance with the signals produced by the first sensor 11 and second sensor 15. The controller 60 examines the completion of reading or failure of reading of information by the magnetic head 13 and operates a transaction processor 62 accordingly. The controller 60 further controls the operation of the second drive motor 63 for the feed rollers 28 and 29 on the second conveyance path 51 and the operations of a sheet dispensing means 52 and print head 21. The second conveyance path 51, print head 21, sheet hopper 27 and sheet dispensing means 52 are operated as a slip issuing means or card receipt issuing means under control of the controller 60.

Figure 4:
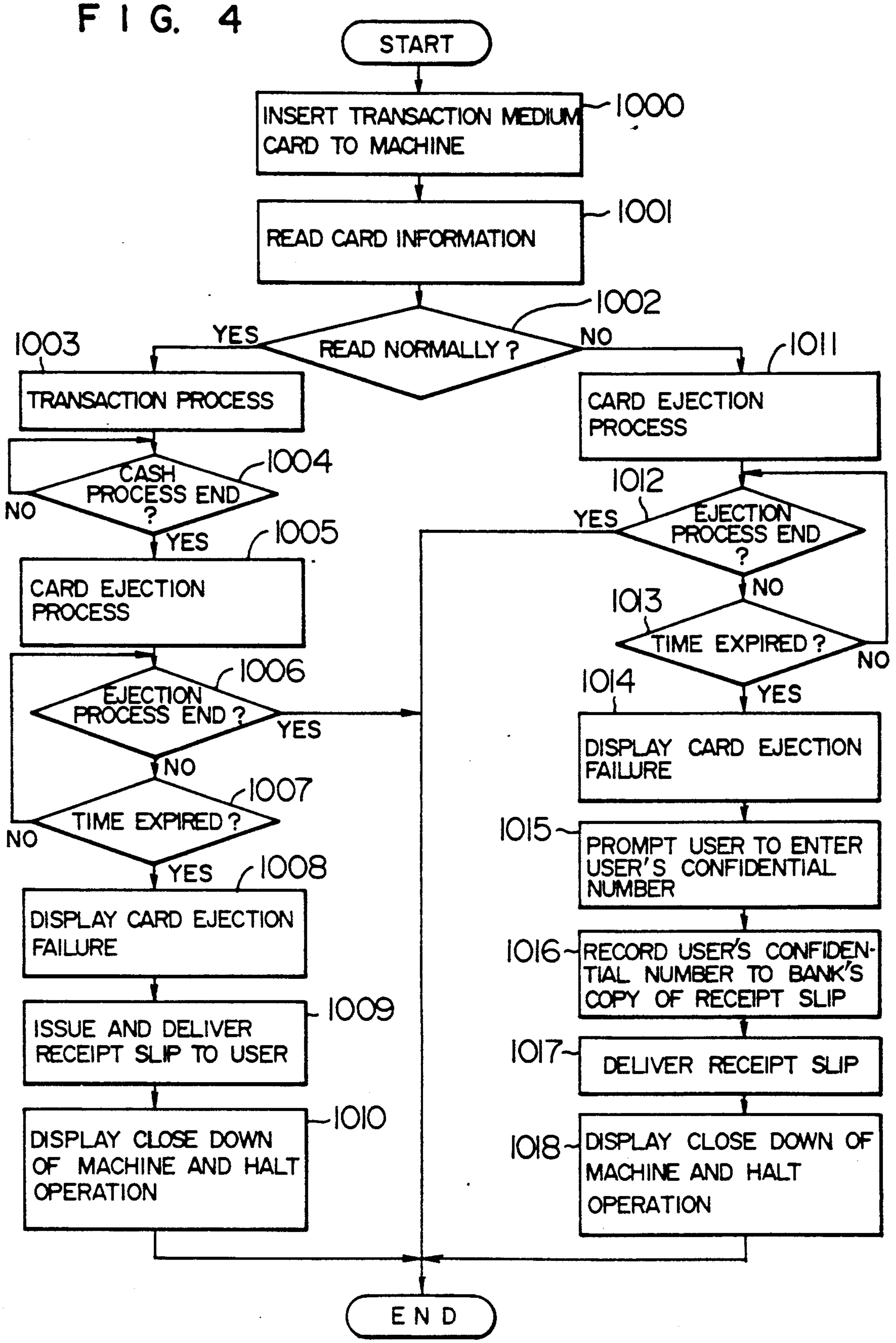
FIG. 4 is a flowchart showing, as an example, the operation of the inventive method and apparatus.

Next, the operation of the foregoing automatic cash transaction machine based on an embodiment of this invention will be explained by reference to the flowchart of FIG. 4.

A user of the automatic cash transaction machine inserts the transaction medium card 14 into the card port 10 (step 1000). The card 14 is fed into the machine by means of the feed rollers 17 and 18 on the first conveyance path 50 that are activated in response to the card insertion detect signal produced by the first sensor 11. The magnetic head 13 reads out information which is recorded magnetically on the card 14 (step 1001). The feed rollers 17 and 18 halt the drive operation in response to the card detect signal produced by the second sensor 15, and the card 14 is kept stationary on the first conveyance path 50 until other processes are complete.

Following the read operation for the card 14, it is determined whether or not information on the card 14 has been read normally (step 1002). In the case of normal reading, the control sequence proceeds to step 1003, in which the transaction processor is activated to carry out the cash transaction process and, on completion of the process (step 1004), the card return process is commenced as follows. The feed rollers 17 and 18 rotate reversely in response to the card return signal so that the card 14 is moved back toward the card port 10 (step 1005).

During the transaction process, the transaction slip issuing means is activated so that a sheet is taken out of the sheet hopper 27, information concerning a transaction is printed on it by the print head 21 and it is delivered to the user by the transaction slip issuing means.

Subsequently, it is tested whether or not the first sensor 11 has detected the card 14 (step 1006). In response to the card detect signal from the first sensor 11, the feed rollers 17 and 18 are deactivated to complete the card return process.

If the first sensor 11 does not detect the card 14 in step 1006, it is determined whether or not a prescribed time has expired since the commencement of the card return process (step 1007). If the time has not yet expired, the control sequence returns to step 1006.

If the time has expired, it is judged that the card 14 has not been ejected normally and the failure of card ejection is displayed on the operation panel 3 (step 1008). Subsequently, the receipt issuing means is activated to issue a receipt slip for the card as follows. A slip 26 is taken out of the sheet hopper 27 by means of the sheet dispensing roller 25 and separation rollers 23 and 24, and it is moved to the print head 21 by the feed rollers 28 and 29. The print head 21 prints user specific information, selected from the information which has been read out of the card in step 1001, on the incoming slip 22 thereby to produce a receipt slip for the card, and the printed slip is delivered to the user through the slip delivery port 20 (step 1009). Whereby, the receipt slip issuing means is operated to issue the receipt slip. After delivering the receipt slip, the card 14 stays anywhere on the first conveyance path 50, and following the delivery of the receipt slip, a message indicative of the disabled condition of the automatic cash transaction machine is displayed on one or both of the guide board 6 and operation panel 3, and the machine suspends further operation (step 1010).

If the step 1002 has failed to read information recorded in the card 14, the card ejection process is carried out by driving the feed rollers 17 and 18 in the reverse direction (step 1011).

It is tested whether or not the first sensor 11 has detected the arrival of the card 14 (step 1012). If the sensor 11 has detected the card 14, the feed rollers 17 and 18 are deactivated, and the card ejection process is complete.

If the first sensor 11 does not detect the card 14 in step 1012, it is tested whether or not a prescribed time has expired since the commencement of the card ejection process (step 1013). If the time has not yet expired, the control sequence returns to step 1012. If the time has expired, it is judged that the card 14 has not been ejected normally and the failure of card ejection is displayed on the operation panel 3 (step 1014). Subsequently, the machine prompts the user to enter user specific information (e.g., user's name, confidential number, etc.) by displaying a message on the operation panel 3 (step 1015), records the entered information on the bank's copy of the receipt (step 1016), and operates the sheet dispensing roller 25 and separation rollers 23 and 24 so that a slip 26 is taken out of the sheet hopper 27 and fed to the print head 21.

The machine operates on the receipt slip issing means to issue a receipt slip for the card as follows. The print head 21 prints user specific information selected from the information entered in step 1015 on the incoming slip 22, and it is delivered as a receipt slip for the card to the user through the slip delivery port 20 (step 1017).

Following the delivery of the receipt slip to the user, a message indicative of the disabled condition of the automatic cash transaction machine is displayed on one or both of the guide board 6 and operation panel 3, and the machine suspends further operation (step 1018).

The machine is subjected to troubleshooting and repair by the staff before it restarts operation. The card 14 which is picked up from the machine by the staff will be returned to the user afterward in exchange for the receipt slip for the card.

Although in the foregoing embodiment the slip 22 is a hardcopy of a transaction to be delivered to the user in the normal operation, or it is a receipt slip for the card when the card cannot be returned to the user, a slip of transaction and a receipt slip for a card may be issued by using separate means.

Although in the foregoing embodiment the card handling section and slip issuing section are integrated as a single unit, these sections may be built in separate units.

According to this invention, when a user's transaction medium card is left in the transaction machine and cannot be returned to the user, the machine operates immediately in response to the ejection failure signal to issue a receipt slip for the card by printing user specific information on a sheet whereby the user is not obliged to wait and the automatic cash transaction machine has enhanced serviceability.

What is claimed is:

1. An automatic transaction apparatus having a section for handling a transaction medium card and operating by being accessed by a user through the use of the transaction medium card, wherein said transaction medium card handling section comprises sensor means for detecting the failure of ejection of a transaction medium card that has been inserted by the user and for producing an ejection failure signal upon detecting such failure; and receipt slip issuing means for issuing a receipt slip for the card in response to the ejection failure signal produced by said sensor means.

2. An automatic transaction apparatus having a section for handling a transaction medium card and operating by being accessed by a user through the use of the transaction medium card, wherein said apparatus comprises sensor means for detecting the failure of ejection of the transaction medium card that has been inserted by the user and for producing an ejection failure signal upon detecting such failure; and receipt slip issuing means for issuing a receipt slip for the card in response to the ejection failure signal produced by said sensor means, said receipt slip issuing means including a printer which prints user identifying information specific to the owner of said card.

3. An automatic transaction apparatus having a card/slip handling unit which deals with a transaction medium card inserted by a user and which produces a slip on which an affair of transaction is printed, said apparatus operating in response to being accessed through the use of the card, said card/slip handling unit comprising sensor means for detecting the failure of card ejection; and receipt slip issuing means for issuing a receipt slip for the card in the event of failure of card ejection, said receipt slip having user identifying information specific to the owner of said card being printed on the receipt slip.

4. An automatic transaction apparatus having a card/slip handling unit which deals with a transaction medium card inserted by a user and which produces a transaction slip on which an affair of transaction is printed, said apparatus operating in response to being accessed through the use of the card, said card/slip handling unit comprising a first conveyance path; a second conveyance path; sensor means disposed on said first conveyance path for detecting the failure of card ejection from said first conveyance path; and transaction slip issuing means disposed on said second conveyance path for issuing a transaction slip with an affair of transaction being printed thereon and receipt slip issuing means for issuing a receipt slip for the card with user identifying information specific to the owner of the card being printed on the receipt slip in the event of failure of card ejection.

5. An automatic transaction apparatus according to claim 4, wherein said transaction slip issuing means and said receipt slip of the card issuing means are built separately in said card/slip handling unit.

6. An automatic transaction apparatus according to claim 4, wherein said transaction slip issuing means and said receipt slip of the card issuing means are built as a single common device in said card/slip handling unit.

7. An automatic transaction apparatus operating in response to being accessed through insertion of a transaction medium card therein, said apparatus comprising a receipt slip issuing means for issuing a receipt slip for the card to the user who inserts the card in the event of failure of card ejection, said receipt slip being printed with user specific information selected from information recorded on the card when the card information has been read successfully, or selected from information entered by the user through an input means of said automatic transaction apparatus when the card information has not been read successfully.

8. An automatic transaction method which implements a transaction in response to being accessed through the insertion of a transaction medium card therein, wherein said method comprises the steps of attempting to read card information from an inserted card using card information reading means; carrying out a transaction process and an ejection process, followed by issuing a transaction slip indicating transaction data on completion of the transaction process, when the card information has been read successfully; carrying out a card ejection process when the card has not been read successfully; and, if the card is not ejected within a predetermined time length after the card ejection process is initiated, halting the card ejection processing and issuing a receipt slip for the card on which is printed user identifying information relating to the user of the card.

9. An automatic transaction method which implements a transaction in response to being accessed through the insertion of a transaction medium card, comprising the steps of, if the card is not ejected within a predetermined time length after initiation of a card ejection process for returning the card to the user, halting the card ejection process; indicating the failure of card ejection to the user and prompting the user to enter information specific to the user; and issuing a receipt slip for the card in response to the entry of information specific to the user as prompted with the indicated failure of the card rejection.

* * * * *